US012624727B2

(12) United States Patent
Funaki et al.

(10) Patent No.: US 12,624,727 B2
(45) Date of Patent: May 12, 2026

(54) CERAMIC BALL MATERIAL COMPRISING A BAND-PORTION OVER SURFACE OF A SPHERICAL PORTION, AND METHOD FOR MANUFACTURING CERAMIC BALL

(71) Applicants: KABUSHIKI KAISHA TOSHIBA, Tokyo (JP); TOSHIBA MATERIALS CO., LTD., Kanagawa (JP)

(72) Inventors: Kai Funaki, Yokohama Kanagawa (JP); Shoya Sano, Yokohama Kanagawa (JP)

(73) Assignee: Niterra Materials Co., Ltd., Yokohama (JP)

( * ) Notice: Subject to any disclaimer, the term of this patent is extended or adjusted under 35 U.S.C. 154(b) by 188 days.

(21) Appl. No.: 18/213,444

(22) Filed: Jun. 23, 2023

(65) Prior Publication Data

US 2023/0332644 A1 Oct. 19, 2023

Related U.S. Application Data

(63) Continuation of application No. PCT/JP2021/047068, filed on Dec. 20, 2021.

(30) Foreign Application Priority Data

Dec. 24, 2020 (JP) ................................. 2020-214951

(51) Int. Cl.
C04B 35/111 (2006.01)
B28B 3/02 (2006.01)
(Continued)

(52) U.S. Cl.
CPC ................ F16C 33/32 (2013.01); B28B 3/02 (2013.01); C04B 35/645 (2013.01);
(Continued)

(58) Field of Classification Search
CPC ....... C04B 35/10; C04B 35/111; C04B 35/18; C04B 35/48; C04B 35/583; C04B 35/584; C04B 2235/963
See application file for complete search history.

(56) References Cited

U.S. PATENT DOCUMENTS 6,485,830 B1 11/2002 Komorita et al.
2024/0191753 A1* 6/2024 Funaki .................. C04B 35/111
(Continued)

FOREIGN PATENT DOCUMENTS

JP S60-18620 A 1/1985
JP H02-129056 A 5/1990
(Continued)

OTHER PUBLICATIONS

Translation JP-3853197 B2 (Year: 2006).*
(Continued)

*Primary Examiner* — Hoa (Holly) Le
(74) *Attorney, Agent, or Firm* — Harness, Dickey & Pierce, P.L.C.

(57) ABSTRACT

A ceramic ball material according to the present embodiment includes a spherical portion, and a band-shaped portion formed over a circumference of a surface of the spherical portion. The band-shaped portion has a width in a range of 0.5 mm or more and 4.0 mm or less, both shoulders of which are provided with an R section having a radius of curvature of 0.02 mm or more. Any one of aluminum oxide, silicon nitride, boron nitride, and zirconium oxide is used as the ceramic.

18 Claims, 4 Drawing Sheets

(51) Int. Cl.
    *C04B 35/645*    (2006.01)
    *F16C 33/32*    (2006.01)

(52) U.S. Cl.
    CPC ...... *C04B 2235/94* (2013.01); *C04B 2235/96*
                (2013.01); *F16C 2206/40* (2013.01)

(56)                    References Cited

U.S. PATENT DOCUMENTS

| | | | |
|---|---|---|---|
| 2024/0199495 A1* | 6/2024 | Funaki | ......... C04B 35/593 |
| 2025/0074831 A1* | 3/2025 | Sano | ......... C04B 35/486 |

FOREIGN PATENT DOCUMENTS

| | | | |
|---|---|---|---|
| JP | H06-48813 A | | 2/1994 |
| JP | H06-229422 A | | 8/1994 |
| JP | H08-109959 A | | 4/1996 |
| JP | 2764589 B2 | | 6/1998 |
| JP | 2000-337386 A | | 12/2000 |
| JP | 2003137640 A | * | 5/2003 |
| JP | 3853197 B2 | * | 12/2006 |
| JP | 2011-93789 A | | 5/2011 |
| JP | 4761613 B2 | | 8/2011 |
| JP | 2013-209283 A | | 10/2013 |

OTHER PUBLICATIONS

Translation JP-2003137640 A (Year: 2003).*
Ichikawa, Shigeki et al. "Wrapping of CIP-molded ceramic balls" Proceedings of the 1997 Japan Society for Precision Engineering Academic Conference, The Japan Society for Precision Engineering, p. 6310633 (1997).
Japanese Office Action issued Jun. 25, 2024 in Japanese Patent Application 2022-571460.
Office Action issued Oct. 1, 2024 by European Patent Office in corresponding European Patent Application No. 21910722.4.
International Search Report for corresponding International Application PCT/JP2021/047068 dated Feb. 1, 2022 (2 pages).

* cited by examiner

DIAGRAM IN WHICH
TWO RUBBER DIES
ARE OVERLAPPED
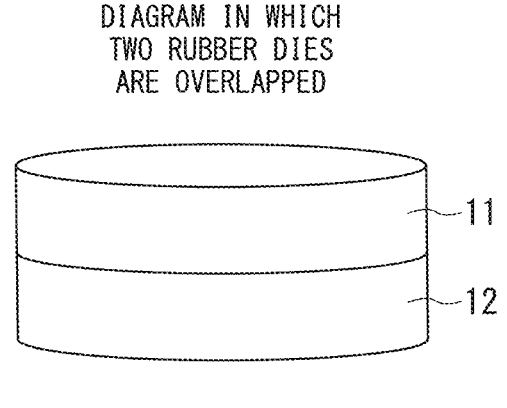
DIAGRAM SHOWING SHAPE OF HOLES PROVIDED
ON RUBBER DIES AND GREEN COMPACT
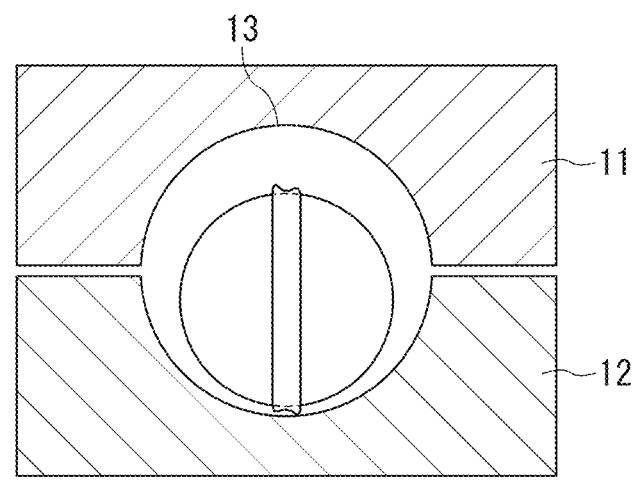
FIG. 7A                    FIG. 7B

CERAMIC BALL MATERIAL COMPRISING A BAND-PORTION OVER SURFACE OF A SPHERICAL PORTION, AND METHOD FOR MANUFACTURING CERAMIC BALL

CROSS-REFERENCE TO RELATED APPLICATION

This application is a Continuation Application of No. PCT/JP2021/047068, filed on Dec. 20, 2021, and the PCT application is based upon and claims the benefit of priority from Japanese Patent Application No. 2020-214951, filed on Dec. 24, 2020, the entire contents of which are incorporated herein by reference.

FIELD

Embodiments discussed later relate to a ceramic ball material, a method for manufacturing a ceramic ball, and a ceramic ball.

BACKGROUND

Various ceramic materials have properties such as high hardness, insulation, and wear resistance. In particular, fine ceramics with enhanced purity and uniform particle size exhibit properties applicable in various fields of, for example, capacitors, actuator materials, and refractories. Products that take advantage of the wear resistance and insulation mentioned above are bearing balls, which are made of materials such as aluminum oxide, silicon nitride, and zirconium oxide. For example, Japanese Patent Laid-Open No. H06-48813 (Patent Document 1) and Japanese Patent No. 2764589 (Patent Document 2) each disclose a bearing ball made of a silicon nitride material, while Japanese Patent Laid-Open No. S60-18620 (Patent Document 3) discloses a bearing ball made of zirconium oxide material.

In the process of manufacturing these materials for bearing balls, a method of sintering a green compact is employed. Press molding using dies is adopted as the molding method. Press molding is generally a method of inserting powder into a cavity between an upper die 1 and a lower die 2, as shown in FIG. 1, then applying pressure thereto. During the press molding, there must be a gap between a tip 3 of the upper die 1 and a tip 4 of the lower die 2 to protect the dies. As a result, a spherical portion and a band-shaped portion are formed in the green compact. For example, Japanese Patent No. 4761613 (Patent Document 4) discloses a bearing ball material including a spherical portion and a band-shaped portion. FIG. 2 shows a conventional ceramic ball material. In FIG. 2, reference character 5A denotes a ceramic ball material, 6A denotes a spherical portion, 7A denotes a band-shaped portion, WA denotes the width of the band-shaped portion 7A, and HA denotes the height of the band-shaped portion 7A.

A ceramic ball material 5A with a spherical portion 6A and a band-shaped portion 7A shown in FIG. 2 is polished to form a ceramic ball. The ceramic ball material 5A with the spherical portion 6A and the band-shaped portion 7A is sometimes referred to as a preliminary ball. For example, the ceramic ball material 5A is polished to a mirror finish with a surface roughness Ra of 0.1 μm or less. The mirror finishing involves machining using surface plate.

In general, ceramic materials have excellent wear resistance but are prone to chipping when strong impacts are applied thereto because the materials are brittle. Curved surfaces easily release impact, while corners are prone to chipping due to impact. Therefore, when machining using surface plate is performed on the ceramic ball material 5A with the band-shaped portion 7A, both shoulders, which are the corners of the band-shaped portion 7A, selectively contact a surface plate, causing chipping.

Each of FIGS. 7A and 7B is a diagram showing an example of die press molding for molding the ceramic ball material according to the embodiment.

DETAILED DESCRIPTION

Hereinafter, embodiments of a ceramic ball material, a method for manufacturing a ceramic ball, and a ceramic ball are described in detail with reference to the drawings.

The ceramic ball material according to an embodiment includes a spherical portion and a band-shaped portion formed over the circumference of the surface of the spherical portion. The band-shaped portion has a width in the range of 0.5 mm or more and 4.0 mm or less, both shoulders of which are provided with an R section having a radius of curvature of 0.02 mm or more.

Figure 3:
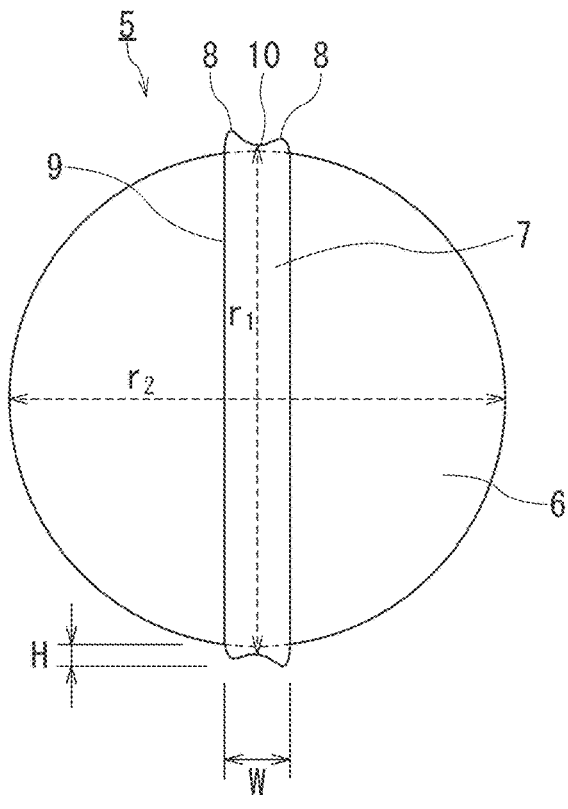
FIG. 3 is an external view showing an example of the ceramic ball material according to the embodiment.

FIG. 3 is a schematic view of a ceramic ball material according to an embodiment. In FIG. 3, reference numeral 5 denotes the ceramic ball material according to the embodiment, 6 denotes the spherical portion, 7 denotes the band-shaped portion, 8 denotes the R section, 9 denotes the side periphery, and 10 denotes the outer periphery. Reference character r1 denotes the diameter of the outer periphery 10 of the band-shaped portion 7, and r2 denotes the diameter of the spherical portion 6. For example, the diameter r2 of the spherical portion 6 is the length of a line segment passing through the center of the spherical portion 6 in the direction perpendicular to a plane formed by the circumference of the band-shaped portion 7. Reference character W denotes the width of the band-shaped portion 7, and H denotes the height of the band-shaped portion 7. The width W of the band-shaped portion 7 is sometimes simply referred to as "width W". The height H of the band-shaped portion 7 is sometimes simply referred to as "height H". In FIG. 3, the sizes of the height H and width W of the band-shaped portion 7 with respect to the spherical portion 6 are illustrated for the purpose of description.

The ceramic ball material 5 includes the spherical portion 6 and the band-shaped portion 7. The band-shaped portion 7 is formed over the circumference of the surface of the spherical portion 6. The circumference of the surface of the spherical portion 6 may be any one of multiple circumferences of the surface of the spherical portion 6. The surface of the spherical portion 6 being a quadric surface is sufficient. Therefore, the spherical portion 6 may be a true sphere or an ellipsoid. The band-shaped portion 7 is provided on the circumference of the spherical portion 6. The width W of the band-shaped portion 7 is, for example, the largest width of the band-shaped portion 7 but may be the average of widths at multiple positions. The height H of the band-shaped portion 7 is, for example, the maximum height of the band-shaped portion 7 but may be an average of heights at multiple positions.

The width W of the band-shaped portion 7 is in the range of 0.5 mm or more and 4.0 mm or less. When the width W is in this range, damage to the die can be suppressed. In addition, the sphericity of the ceramic ball material 5 can be increased. As the sphericity of the ceramic ball material 5 increases, the machining time during the polishing process can be shortened.

Figure 1:
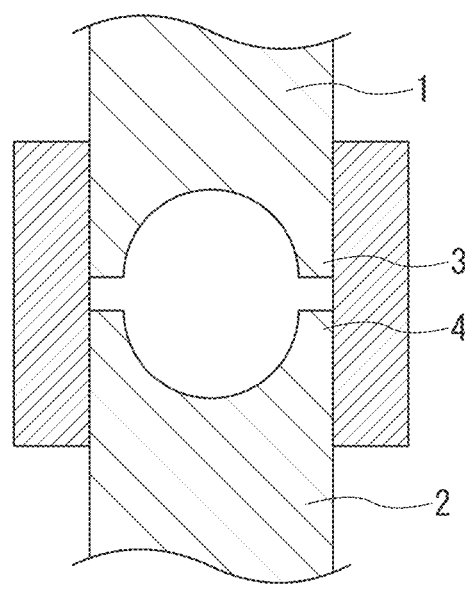
FIG. 1 is a cross-sectional view showing an example of a general die press molding apparatus.
Figure 2:
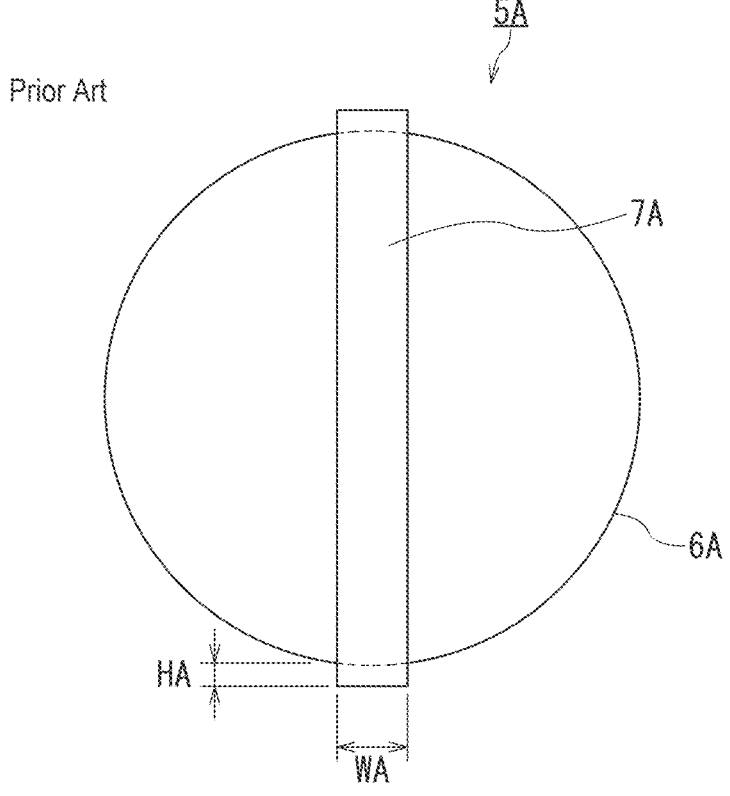
FIG. 2 is an external view showing an example of a conventional ceramic ball material.

When the width W is less than 0.5 mm, compression forces on the tip 3 of the upper die 1 and tip 4 of the lower die 2 shown in FIG. 1 become very large, which may cause damage to the dies. Further, density heterogeneity may occur around the band-shaped portion of the resulting sintered compact. If the density is uneven, the sintered compact is prone to defects, which may adversely affect the wear resistance.

When the width W exceeds 4.0 mm, the sphericity of the ceramic ball material 5 decreases. As the sphericity decreases, the percentage of the spherical portion 6 decreases. As the sphericity of the ceramic ball material 5 decreases, a machining allowance during the polishing process increases, resulting in a longer machining process time.

Thus, the width W is preferably 0.5 mm or more and 4 mm or less, and more preferably 0.8 mm or more and 3.5 mm or less.

The band-shaped portion 7 comprises both shoulders extending over the circumference of the band-shaped portion 7, a side periphery 9 extending in the circumferential direction of the band-shaped portion 7, and an outer periphery 10 extending over the circumference of the band-shaped portion 7. Both shoulders of the band-shaped portion 7 are provided with an R section 8 having a radius of curvature of 0.02 mm or more. The R section 8 is present on both shoulders of the band-shaped portion 7. The R section is a rounded shape. Both shoulders of the band-shaped portion 7 are provided with the R section 8 having a radius of curvature of 0.02 mm or more, whereby surface contact with the grinding stone for polishing can be achieved. When the R section 8 has a radius of curvature of less than 0.02 mm or an angular shape, the contact with the grinding stone is a point contact. The angular shape refers to a shape in which both shoulders are at an angle of 90° or less in the cross-section of the band-shaped portion 7. When it comes to point contact, brittle fracture is likely to occur in contact between the ceramic ball material 5 and the grinding stone. In particular, brittle fracture is more likely to occur in contact with the surface plate during machining using surface plate. Thus, the R section preferably has a radius of curvature of 0.02 mm or more, and more preferably 0.2 mm or more.

Here, a method of measuring the radius of curvature of the R section 8 of the band-shaped portion 7 in the ceramic ball material 5 is described.

The shape measurement is performed using an optical three-dimensional shape measuring device, Keyence VR-5000, with its analysis software. The measuring device may be one having a function equivalent thereto.

Figure 4:
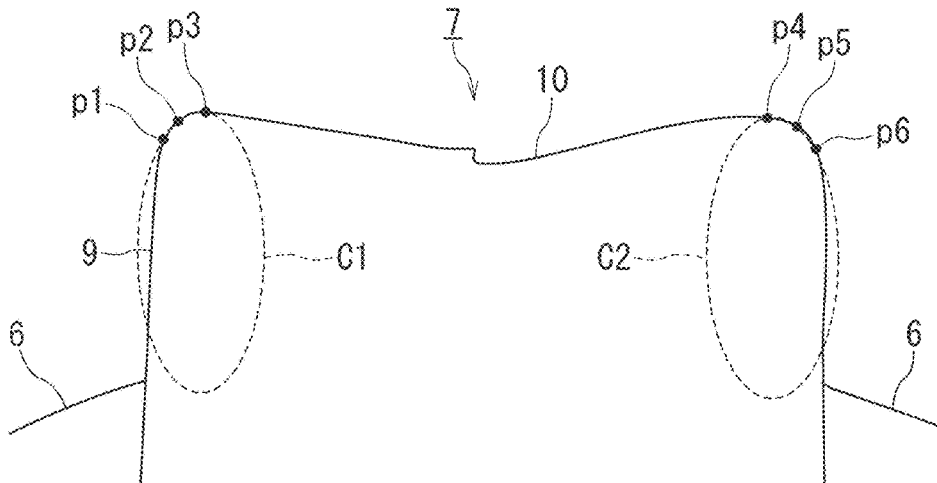
FIG. 4 is an external view showing an example of a band-shaped portion.

A measurement area is an area where the height H of the band-shaped portion 7 is ¼ or more and the entire width W is included. The screen is set at a magnification so as to include the measurement area. FIG. 4 shows an example of the R section 8 in the band-shaped portion 7. In FIG. 4, reference numerical 6 denotes the spherical portion, 7 denotes the band-shaped portion, and 8 denotes the R section. FIG. 4 is a side view including a part of the band-shaped portion 7 that protrudes from the spherical portion 6.

The method of measuring the radius of curvature of the R section 8 using the optical three-dimensional shape measuring device is described. Hereinafter, the concept of the method of measuring the radius of curvature is described. The measurement itself is automatically calculated using the analysis software provided in the three-dimensional shape measuring device.

The measurement of the radius of curvature of the R section 8 is performed using the function for measuring the radius of curvature of the three-dimensional shape measuring device by calculation using an imaginary circle C1 obtained by selecting three points p1, p2, and p3 in the R section 8 on one side. In this case, the point p1 is a boundary point between the side periphery 9 of the band-shaped portion 7 and the R section 8; the point p3 is a boundary point between the R section 8 and the outer periphery 10 of the band-shaped portion 7; and the point p2 is a point between the point p1 and the point p3. The calculation result is taken as the radius of curvature of the R section 8. Similarly, the radius of curvature of the R section 8 on the opposite side is calculated using an imaginary circle C2 obtained by selecting three points p4, p5, and p6. In this case, the point p6 is a boundary point between the side periphery 9 of the band-shaped portion 7 and the R section 8; the point p4 is a boundary point between the R section 8 and the outer periphery 10 of the band-shaped portion 7; and the point p5 is a point between the point p6 and the point p4. The average of the calculation result of both shoulders is taken as the radius of curvature of the R section 8. The imaginary circles C1 and C2 may be ellipses as long as they pass through the respective points. In this regard, automatic calculation using the analysis software is preferred.

When the imaginary circles C1 and C2 both do not pass through the points p1 to p6, it is determined that the radius of curvature cannot be measured accurately. Similarly, if there exist points separated by 10 μm or more when an actual curve formed by points p1 to p6 is compared with the curve along the relevant points formed by the imaginary circles C1 and C2, it is determined that the radius of curvature cannot be measured accurately. When it is determined that the radius of curvature cannot be measured accurately as described above, points p1 to p6, especially points p2 and p5 in-between, are selected again to measure the radius of curvature. Measuring again means reselecting the points p1 to p6, especially the points p2 and p5 in between, in the same field of view. In this case, some of the points p1 to p6 may be selected from the previous measurement point. Note that the method of selecting the points p1 to p6 is based on the preceding paragraph.

In addition, a method of measuring the radius of curvature of the concave shape of the outer periphery 10 sandwiched between the shoulder portions of the band-shaped portion 7, which will be discussed later, is also described. Here, the concave shape of the outer periphery 10 means that, in the band-shaped portion 7 along the circumference, the outer periphery 10 is more concave continuously along the circumference than both shoulders. The three-dimensional shape measuring device is also used to measure the radius of curvature of the concave shape of the outer periphery 10. Hereinafter, the concept of the method of measuring the radius of curvature is described. The measurement of the radius of curvature of the concave shape itself is automatically performed by calculation using the analysis software provided in the three-dimensional shape measuring device.

Figure 5:
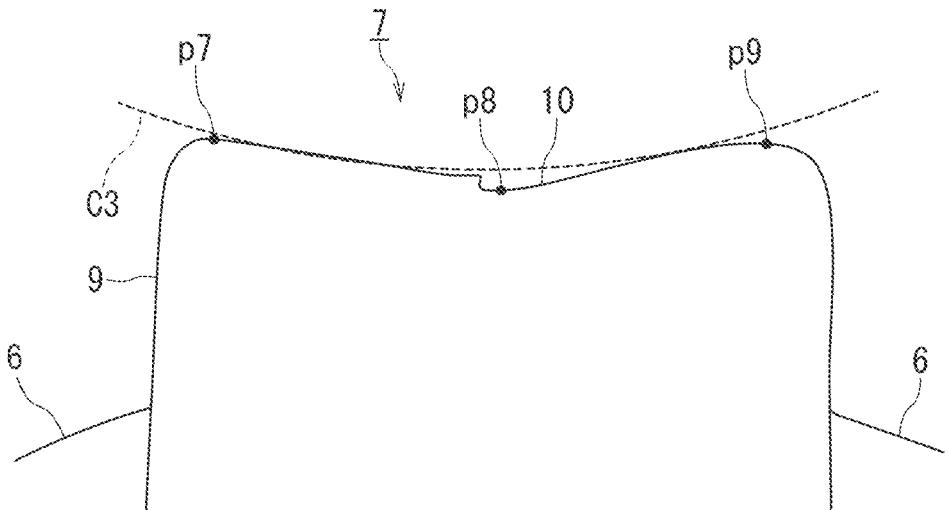
FIG. 5 is an external view showing another example of the band-shaped portion.

FIG. 5 shows an example of the concave shape of the band-shaped portion 7. FIG. 5 is a side view including a part of the band-shaped portion 7 that protrudes from the spherical portion 6. As shown in FIG. 5, three points p7, p8, and p9 on the outer periphery 10 of the band-shaped portion 7 are selected to measure the curvature. At this point, if there exist points separated by 10 μm or more when an actual curve formed by the points p7 to p9 is compared with a curve along the relevant points p7 to p9 on an imaginary circle C3, it is determined that the radius of curvature cannot be measured accurately. In this case, three points p7, p8, and p9 are selected again to measure the curvature.

Figure 6:
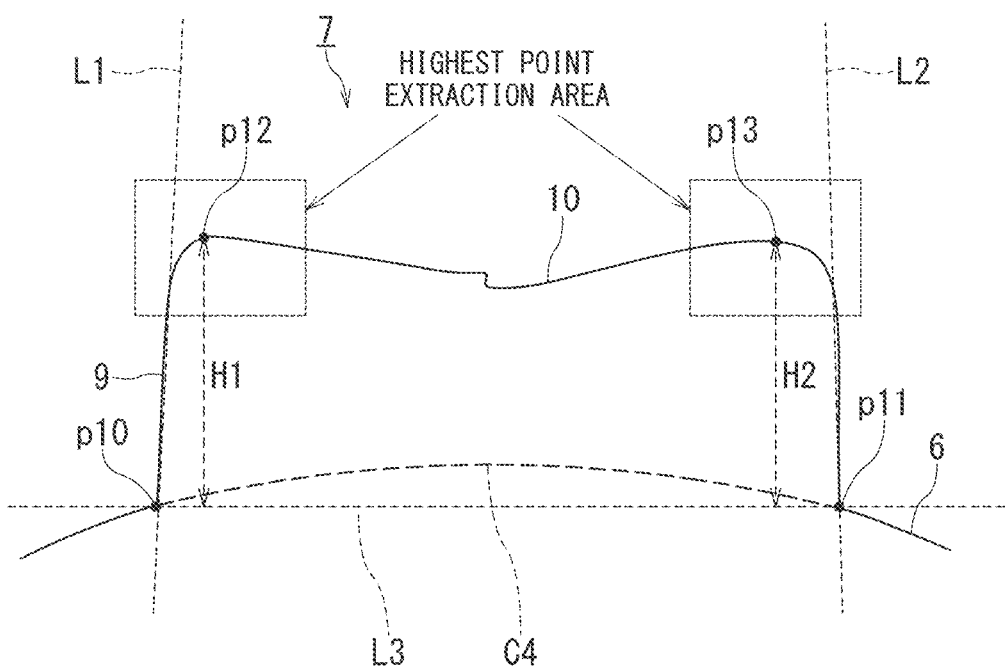
FIG. 6 is an external view showing the other example of the band-shaped portion.

The case of measuring the height H of the band-shaped portion 7 is also described. FIG. 6 is a side view including a part of the band-shaped portion 7 that protrudes from spherical portion 6. As shown in FIG. 6, an imaginary circle C4 is first drawn at a position behind the band-shaped portion 7 that coincides with the spherical portion 6. Next, extended imaginary lines L1 and L2 are drawn along the side periphery 9 of the band-shaped portion 7, and intersections between the extended imaginary lines L1 and L2 and the spherical portion 6 are defined as points p10 and p11, respectively. If there exist points separated by 5 μm or more when the side periphery 9 of the band-shaped portion 7 and the extended imaginary lines L1 and L2 are compared, it is determined that the extended imaginary lines have not been drawn accurately, so the lines are redrawn. The points with the maximum height are extracted at both shoulders of the band-shaped portion 7 in the highest point extraction area and are defined as points p12 and p13. The shortest distances H1 and H2 from the points p12 and p13 are measured with respect to the line segment L3 connecting the points p10 and p11, respectively, and the average is defined as the height H of the band-shaped portion 7 (shown in FIG. 3). The shortest distances of the points p10 and p11 are each measured and defined as the width W of the band-shaped portion 7 (shown in FIG. 3).

In addition, a method of measuring the diameter r1 of the band-shaped portion 7 and the diameter r2 of the spherical portion 6, which will be discussed later, is described. The diameters r1 and r2 are illustrated in FIG. 3. The diameter r1 is the length extended from the center of the outer periphery 10 of the band-shaped portion 7 (the center between side peripheries 9 at both ends) toward the center of the outer periphery 10 on the opposite side, i.e., the diameter of the outer periphery 10. When the outer periphery 10 of the band-shaped portion 7 has a concave shape, the diameter r1 is the diameter between the concave shape and the concave shape on the opposite side. The diameter r2 of the spherical portion 6 is, for example, the diameter of the spherical portion 6 that passes through the center of the spherical portion 6 in the direction orthogonal to the plane formed by the circumference of the band-shaped portion 7.

The measurement of the diameters r1 and r2 is performed using a non-contact image dimension measuring device, Keyence IM-7000, or a device having a function equivalent thereto. The non-contact image dimension measuring device projects light onto an object from directly above to measure the dimension from its shadow. The measurement method is described below. The ceramic ball material 5 is placed on the stage. At this time, the ceramic ball material 5 is placed such that one of the radial directions of the band-shaped portion 7 is horizontally in the projection direction. When the band-shaped portion 7 is at an angle of 5° or more from the projection direction, the concave portion of the outer periphery 10 of the band-shaped portion 7 becomes invisible. The diameter r1 can be evaluated by setting up and measuring a measurement area so that the distance between the centers of the concave shape of the outer periphery 10 of the band-shaped portion 7 on the diagonal can be measured. The diameter r2 of the spherical portion 6 is measured as the length of a line segment passing through the center of the spherical portion 6 in the direction perpendicular to a plane formed by the circumference of the band-shaped portion 7.

The outer periphery 10 of the band-shaped portion 7 is preferably flat or concave. The outer periphery 10 of the band-shaped portion 7 is preferably concave in shape. The concave shape indicates that the outer periphery 10 of the band-shaped portion 7 is concave with respect to both shoulders at both ends. If the outer periphery 10 is flat or concave, the R section 8 is easily formed on both shoulders of the band-shaped portion 7. On the other hand, if the outer periphery 10 of the band-shaped portion 7 is convex, the protrusion of that portion is likely to cause brittle fracture due to contact during machining using surface plate.

The concave shape of the outer periphery 10 of the band-shaped portion 7 has a radius of curvature of 5 mm or more. When the ceramic ball material 5 is polished into a ceramic ball, the band-shaped portion 7 is ground. By increasing the radius of curvature of the concave shape of the outer periphery 10, the volume of the band-shaped portion 7 to be ground can be reduced, thereby making it possible to reduce the polishing allowance. The upper limit of the radius of curvature of the concave shape of the outer periphery 10 of the band-shaped portion 7 is not particularly limited but is preferably 30 mm or less. If the radius of curvature of the concave shape becomes too large, it may be difficult to control the radius of curvature of the R section 8. The concave shape of the outer periphery 10 of the band-shaped portion 7 may contain minute irregularities on its surface. Although the convex portion (protrusion) is shown on the outer periphery 10 in FIGS. 4 to 6, the convex portion is not an essential configuration. In addition, when the convex portion (protrusion) is present on the outer periphery 10, the height of the convex position is lower than that of both shoulders.

The concave shape of the outer periphery 10 of the band-shaped portion 7 preferably has a ratio of the radius of curvature/the width W of the band-shaped portion of 10 or less. When the concave shape of the outer periphery 10 of the band-shaped portion 7 has a ratio of the radius of curvature/the width W of the band-shaped portion of more than 10, the curvature of the concave shape may be too large to control the radius of curvature of both shoulders of the band-shaped portion 7.

The height H of the band-shaped portion 7 is preferably 2.5% or less with respect to the diameter r1 of the band-shaped portion 7, where (height H of band-shaped portion 7/diameter r1 of band-shaped portion)×100≤2.5 is satisfied. As mentioned above, the band-shaped portion 7 is removed by polishing. When the height H of the band-shaped portion 7 becomes larger than the diameter r1 by 2.5%, the load of polishing increases. Furthermore, brittle fracture due to contact during machining using surface plate is likely to occur. Note that the lower limit of the height H of the band-shaped portion 7 is preferably 0.1% or more with respect to the diameter r1 of the band-shaped portion 7. If the height H of the band-shaped portion 7 is too small, densi-fication around the band-shaped portion 7 may become difficult. For this reason, it is preferred that 0.1≤(the height H of the band-shaped portion 7/the diameter r1 of the band-shaped portion)×100≤2.5 is satisfied.

The spherical portion 6 preferably has a diameter r2 of 0.5 mm or more. It is also preferred that the spherical portion 6 has an arbitrary diameter in the range of 8 mm or more and 70 mm or less, and the height H of the band-shaped portion is 1% or less of the diameter r2 of the spherical portion, which is indicated by (the height H of the band-shaped portion 7/the diameter r2 of the spherical portion 6)×100≤1.

In addition, the ratio (r1/r2) of the diameter r1 of the band-shaped portion 7 to the diameter r2 of the spherical portion 6 is preferably in the range of 0.9≤r1/r2≤1.1.

When the spherical portion 6 has an arbitrary diameter r2 of less than 0.5 mm, it becomes difficult to control the radius of curvature of the R section 8. For this reason, it is further preferred that the spherical portion 6 has a diameter r2 of 8 mm or more and 70 mm or less.

Moreover, 0.9≤r1/r2≤1.1 indicates that the diameter r1 of the band-shaped portion 7 and the diameter r2 of the spherical portion 6 are approximated to each other. Thus, it is possible to suppress stress concentration by making the initial contact with the surface plate for machining uniform so as to suppress damage during machining.

The ceramic ball material 5 preferably contains one or more of aluminum oxide ($Al_2O_3$), silicon nitride ($Si_3N_4$), boron nitride (BN), and zirconium oxide ($ZrO_2$) in an amount of 85% by mass or more. The ceramic ball material 5 is made of a ceramic sintered compact. The content in the ceramic sintered compact is 85% by mass or more of one or more of aluminum oxide, silicon nitride, boron nitride, and zirconium oxide. In other words, the ceramic sintered compact may contain 15% by mass or less of substances other than those mentioned above. The ceramic ball material 5 preferably contains 85% by mass or more of silicon nitride.

For example, the aluminum oxide sintered compact, silicon nitride sintered compact, boron nitride sintered compact, zirconium oxide sintered compact, and Alusil sintered compact are used as bearing balls. The Alusil sintered compact is a sintered compact in which aluminum oxide and zirconium oxide are mixed. Among them, bearing balls made of silicon nitride sintered compact have the best wear resistance. For instance, aluminum oxide, zirconium oxide, and Alusil have a Vickers hardness of about 1,200 to 1,700 but a low fracture toughness value of about 3 to 6 MPa·m$^{1/2}$. On the other hand, the silicon nitride sintered compact has a Vickers hardness of 1,400 to 1,800 and a high fracture toughness value of 5 to 10 MPa·m$^{1/2}$. The silicon nitride sintered compact has both high toughness and Vickers hardness, which makes it excellent in wear resistance. The silicon nitride sintered compact has a structure mainly composed of β-type silicon nitride crystal particles. The β-type silicon nitride crystal particles have long and narrow shapes, in which a high toughness value is achieved by complex-intertwining of long and narrow crystal particles. Although the silicon nitride sintered compact has an aspect that the polishing efficiency is very poor due to its high mechanical strength, the polishing efficiency can be improved even in the ceramic ball material 5 made of a ceramic sintered compact with high strength such as silicon nitride sintered compact by providing the band-shaped portion 7 with an R section, as mentioned above.

Next, a method for manufacturing the ceramic ball material 5 is described. The manufacturing method is not particularly limited as long as the ceramic ball material 5 according to the embodiment satisfies the above configuration, but the following manufacturing method is a method for efficiently manufacturing the ceramic ball material 5.

The method for manufacturing the ceramic ball material 5 is described with the case of using a silicon nitride sintered compact as an example.

First, a sintering aid, additive, solvent, binder, and the like are added in appropriate quantities to silicon nitride as a raw material, then mixed, crushed, and granulated with a spray dryer. Through this process, the granulated powder is prepared as the raw material powder. When the total of the silicon nitride powder and the sintering aid powder is 100% by mass, the silicon nitride powder is preferably 85% by mass or more. The additive is a plasticizer. The solvent is water or an organic solvent. Examples of the organic solvent include alcohol, ketone, and benzene. The binder is an organic substance. The amount of the binder added is in the range of 3 to 20 parts by mass when the total of the silicon nitride powder and the sintering aid powder is 100 parts by mass. By adjusting the amount of the binder, it becomes easy to impart a concave shape to the outer periphery 10 of the band-shaped portion 7 in a process discussed later.

Next, press molding is performed using the granulated powder, examples of which include a molding method using the upper die 1 and the lower die 2 of the press molding apparatus shown in FIG. 1. The spherical shape inside the upper die 1 and the lower die 2 becomes the spherical portion 6 of the ceramic ball material 5. By adjusting the shape of the tip 3 of the upper die 1 and the tip 4 of the lower die 2 at the time of press molding and the amount of powder filled, it is possible to adjust the width W and height H of the band-shaped portion 7 of the ceramic ball material 5. Similarly, the diameter r1 and the diameter r2 can be adjusted. For example, press molding is performed by setting the distance between the tip 3 of the upper die 1 and the tip 4 of the lower die 2 during the molding to 0.5 mm or more and 4 mm and then filling the gap with the granulated powder, whereby the width W of the band-shaped portion 7 can be controlled in the range of 0.5 mm or more and 4 mm or less.

The green compact obtained by press molding has a spherical portion and a band-shaped portion. The spherical portion and band-shaped portion of the green compact correspond to the spherical portion 6 and band-shaped portion 7 of the above-mentioned ceramic ball material 5, respectively. Reference numeral r1-1 denotes the diameter of the band-shaped portion of the green compact, and r2-1 denotes the diameter of the spherical portion. The method of measuring the diameter r1-1 and diameter 2-1 of the green compact is the same as the method of measuring the diameters r1 and r2 of the above-mentioned ceramic ball material 5. In the stage of the green compact, it is preferred that 0.85≤(r1-1)/(r2-1)≤1.05 is satisfied. Within this range, a sintered compact obtained through a sintering process discussed later can be made to satisfy 0.9≤r1/r2≤1.1, which takes into account the shrinkage of the green compact due to the sintering process.

In addition, it is also preferable to perform isostatic pressing on the green compact. Through isostatic pressing, it is possible to uniformly apply compression to the granulated powder in the green compact, thereby making it possible to reduce the remaining crushed granulated powder in the green compact. By reducing the remaining crushed granulated powder, it is possible to control the shrinkage rate in the sintering process.

The isostatic pressing method using rubber dies is described as an example of isostatic pressing. Each of FIGS. 7A and 7B shows an example of a disk-shaped rubber die. In FIGS. 7A and 7B, reference numerals 11 and 12 denote disk-shaped rubber dies, and 13 denotes a space. In addition, FIG. 7A is a side view of a state in which the disk-shaped rubber dies 11 and 12 are overlapped. FIG. 7B is a cross-sectional view showing an example in which a green compact is placed in the space 13 within the disk-shaped rubber dies 11 and 12.

The disk-shaped rubber dies 11 and 12 have hemispherical holes on both surfaces that are larger than the diameter r1 of the green compact by about 1% or more and 35% or less. By placing the green compact in the holes and overlapping the rubber dies, the green compact is sealed in the space 13 surrounded by the rubber dies. A hydrostatic pressure higher than the pressure at the time of forming is applied to the rubber dies, thereby making it possible to uniformly apply compression to the green compact. This process can reduce the remaining crushed granulated powder. It is preferred that the rubber dies 11 and 12 be placed so that the band-shaped portion 7 of the green compact is perpendicular to the cylindrical direction of the rubber dies as shown in FIGS. 7A and 7B. The rubber die 11 and the rubber die 12 to be used preferably have a Shore hardness Hs of 30 or more and 50 or less. With the hardness of the rubber dies in this range, the rubber dies can have a deformability that allows uniform contact between the surface of the green compact and the rubber dies. The rubber dies also have good durability. Through this process, the R section 8 having a radius of curvature of 0.02 mm or more can be formed on both shoulders of the band-shaped portion 7 in the green compact. By adjusting the size ratio of the diameter r1-1 of the green compact to the space 13, it is possible to adjust the radius of curvature of the concave shape of the outer periphery 10 in the band-shaped portion 7 of the green compact and the height H of the band-shaped portion 7.

Subsequently, a degreasing process is performed to degrease the green compact, in which the green compact is heated at a temperature equal to or higher than the decomposition temperature of organic components such as binder to evaporate the organic components. The degreasing process may be performed in a nitrogen atmosphere or an air atmosphere. Through the degreasing process, a degreased compact can be obtained.

Next, a sintering process is performed to sinter the degreased compact. The sintering process is preferably performed at a temperature of 1,600 degrees Celsius or more and 2,000 degrees Celsius or less in a nitrogen atmosphere. The pressure during sintering is preferably in the range of atmospheric pressure or more and 300 MPa or less. Note that the atmospheric pressure is 0.10133 MPa (=1 atm). The sintered compact obtained by the sintering process may be subjected to a hot isostatic pressing (HIP) treatment. Through this step, the ceramic ball material 5 can be obtained. The ceramic ball material 5 is a ceramic sintered compact having a theoretical density of 98% or more.

With respect to the adjustment of the radius of curvature of the R section 8 of both shoulders in the band-shaped portion 7, a method of polishing a completed ceramic ball material 5 may be applied. However, this method is not desirable because an additional polishing step is required. The manufacturing method described above is desirable.

A ceramic ball can be manufactured by polishing the ceramic ball material 5. A typical polishing process for balls is a machining process using surface plate. For example, the ceramic ball material 5 is inserted into a cavity between parallel upper and lower surface plates. By the movement of the polishing surface plates, the ceramic ball material 5 is processed into a perfect spherical shape. The surface roughness of bearing balls is specified in ASTM F2094. Depending on the application, bearing balls are graded according to ASTM F2094 and polished to a surface roughness Ra according to that grade. As the grade increases, some bearing balls are polished to a mirror finish with a surface roughness Ra of 0.01 μm or less. Note that ASTM refers to standards published by ASTM International, formerly known as American Society for Testing and Materials (ASTM).

The ceramic ball material 5 according to the embodiment includes the R section 8 having a radius of curvature of 0.02 mm or more at both shoulders of the band-shaped portion 7. As a result, surface contact with a grinding stone of, for example, a lapping plate can be achieved, thereby preventing the ceramic ball material 5 from being damaged in the polishing process. In addition, the durability of the lapping plate can be improved. By controlling the shape and the like of the band-shaped portion 7, it is possible to improve the workability while reducing the polishing allowance.

EXAMPLES

Examples 1 to 7 and Comparative Examples 1 to 3

Sintering aids, additives, solvents, and binders were added to the raw ceramic powder, then mixed, crushed, and granulated with a spray dryer. Examples 1 to 3, 5, and 6 were silicon nitride sintered bodies, Example 4 was an aluminum oxide sintered compact, and Example 7 was an Alusil sintered compact. The silicon nitride sintered bodies contained silicon nitride in an amount of 85% by mass or more. The aluminum oxide sintered compact contained aluminum oxide in an amount of 85% by mass or more. In addition, the Alusil sintered compact contained aluminum oxide and zirconium oxide in a total of 85% by mass or more. When the main component and a sintering aid were each 100 parts by mass, the amount of binder added was in the range of 3 to 20 parts by mass.

Next, press molding was performed using the granulated powder, which is die forming using the upper and lower dies of a press molding apparatus shown in FIG. 1. The die forming was followed by isostatic pressing, which involved the use of a disk-shaped rubber die with a Shore hardness Hs of 30 or more and 50 or less. The isostatic pressing was performed with the disk-shaped rubber dies 11 and 12 having hemispherical holes on both surfaces that were larger than the diameter r1 of the green compact by 1% or more and 35% or less. The band-shaped portion of the green compact was placed perpendicular to the cylindrical direction of the rubber dies. In this state, a hydrostatic pressure higher than the pressure at the time of forming was applied in the process of isostatic pressing.

Next, a sintering process was performed at 1,600 to 2,000 degrees Celsius in a nitrogen atmosphere, and at atmospheric pressure, followed by HIP treatment at 1,600 to 2,000 degrees Celsius in a nitrogen atmosphere, and at a pressure of 200 MPa.

Through this process, ceramic ball materials according to Examples were produced. Comparative Examples were prepared by adding 3 parts by mass of binder when the main component and the sintering aid were each 100 parts by mass. Isostatic pressing was not performed after the molding process.

The shape of the ceramic ball materials 5 according to Examples and the shape of ceramic ball materials according to Comparative Examples were each measured by methods as described above. Note that H/r1 (%) means (H/r1)×100 (%). The results are shown in Table 1.

TABLE 1

| | Ceramic Ball Material | | | | | |
|---|---|---|---|---|---|---|
| | | Band-Shaped Portion | | | | |
| | Type of Ceramic Sintered Compact | Width W [mm] | Height H [mm] | H/r1 [%] | Radius of Curvature of R Section [mm] | Radius of Curvature of Outer Periphery [mm] |
| Example 1 | $Si_3N_4$ | 1.5 | 0.1 | 1.0 | 0.30 | 10 |
| Example 2 | $Si_3N_4$ | 0.8 | 0.12 | 1.4 | 0.10 | 7 |
| Example 3 | $Si_3N_4$ | 3.0 | 0.20 | 0.9 | 0.30 | 25 |
| Example 4 | $Al_2O_3$ | 3.5 | 0.15 | 1.7 | 0.05 | 0 |
| Example 5 | $Si_3N_4$ | 3.2 | 0.18 | 0.7 | 0.25 | 18 |
| Example 6 | $Si_3N_4$ | 3.5 | 0.55 | 2.3 | 0.35 | 20 |
| Example 7 | Alusil | 2.5 | 0.12 | 0.5 | 0.08 | 10 |
| Comparative Example 1 | $Si_3N_4$ | 6.0 | 0.2 | 0.9 | 0.10 | 20 |
| Comparative Example 2 | $Al_2O_3$ | 1.0 | 0.1 | 1.1 | — (sharp angle) | 7 |
| Comparative Example 3 | $Al_2O_3$ | 0.3 | 0.3 | 3.4 | 0.08 | 4 |

| | Ceramic Ball Material | | | Diameter After |
|---|---|---|---|---|
| | Diameter r1 [mm] | Diameter r2 [mm] | r1/r2 | Polishing [inch] |
| Example 1 | 10.3 | 10.5 | 0.98 | ⅜" |
| Example 2 | 9.0 | 9.2 | 0.98 | ⁵⁄₁₆" |
| Example 3 | 23.8 | 23.8 | 1.00 | ⅞" |
| Example 4 | 8.7 | 9.5 | 0.92 | ⁵⁄₁₆" |
| Example 5 | 24.5 | 23.6 | 1.05 | ⅞" |
| Example 6 | 23.7 | 23.2 | 1.02 | ⅞" |
| Example 7 | 24.2 | 24.0 | 1.01 | ⅞" |
| Comparative Example 1 | 24.1 | 23.0 | 1.05 | ⅞" |
| Comparative Example 2 | 8.5 | 9.6 | 0.89 | ⁵⁄₁₆" |
| Comparative Example 3 | 9.0 | 8.9 | 1.01 | ⁵⁄₁₆" |

Example 1 is a ceramic ball material 5 for ceramic balls to be formed into ⅜ inches (9.525 mm) after the polishing process. Examples 2 and 4 are each a ceramic ball material 5 for ceramic balls of ⁵⁄₁₆ inches (7.9375 mm). Examples 3 and 5 to 7 are each a ceramic ball material 5 for ceramic balls of ⅞ inches (22.225 mm). Comparative Examples 2 and 3 are each a ceramic ball material for ceramic balls of ⁵⁄₁₆ inches (7.9375 mm), as in Examples 2 and 4. Comparative Example 1 is a ceramic ball material for ceramic balls of ⅞ inches (22.225 mm), as in Examples 3 and 5 to 7. The ceramic ball materials 5 of Examples 1 to 7 and ceramic ball materials of Comparative Examples 1 to 3 can all be used as beating balls.

Comparative Examples 1 and 3 each have the width W of the band-shaped portion outside the range. In Comparative Example 2, the band-shaped portion includes both shoulders having the radius of curvature of the R section outside the range. In Comparative Example 2, both shoulders of the band-shaped portion have an acute angle of less than 90°.

The ceramic ball materials 5 of Examples and ceramic ball materials of Comparative Examples were evaluated with respect to polishing efficiency. The evaluation was conducted by examining how many batches the surface grinding stone could withstand when each ceramic ball material is machined using a #180 surface grinding stone and one batch is defined according to the size of the ceramic ball materials. The polishing process was performed so that the ceramic balls each had a surface roughness Ra of 0.01 μm.

The rate of occurrence of defects such as chipping of the ceramic ball materials during the polishing process was also examined. The defect rate was calculated by visually inspecting one batch, and the rate of chipping was expressed as the percentage of material chipping defects (%), which was rounded off to two decimal places.

Diameter variation, a deviation of the diameter of the intended polished ceramic balls, was also examined. The diameter variation was defined as the difference between the minimum and maximum diameters when the entire circumference of the sphere was measured. The diameter variation was defined as the average of the results of measuring 10 ceramic balls arbitrarily selected in one batch. The results are shown in Table 2.

TABLE 2

| | The Number Processed [The Number/ 1 Batch] | Endurance Times of Grindstone [Times] | Percentage of Material Chipping Defects [%] | Deviation of Diameter [μm] |
|---|---|---|---|---|
| Example 1 | 10,000 | 15 | 0.0 | 0.08 |
| Example 2 | 15,000 | 15 | 0.0 | 0.12 |
| Example 3 | 1,000 | 15 | 0.0 | 0.20 |
| Example 4 | 15,000 | 15 | 0.6 | 0.13 |
| Example 5 | 1,000 | 15 | 0.0 | 0.21 |
| Example 6 | 1,000 | 15 | 0.0 | 0.22 |
| Example 7 | 1,000 | 15 | 0.0 | 0.23 |
| Comparative | 1,000 | 5 | 1.0 | 0.40 |

TABLE 2-continued

| | The Number Processed [The Number/ 1 Batch] | Endurance Times of Grindstone [Times] | Percentage of Material Chipping Defects [%] | Deviation of Diameter [μm] |
|---|---|---|---|---|
| Example 1 | | | | |
| Comparative Example 2 | 15,000 | 3 | 8.0 | 0.28 |
| Comparative Example 3 | 15,000 | 3 | 1.2 | 0.13 |

As can be seen from Table 2, the durability of the grindstone was improved in the ceramic ball material 5 according to Examples. The rate of defects of the ceramic ball materials 5 according to Examples declined. The deviation from the target diameter was also reduced in the ceramic ball material 5 according to Examples. Therefore, it is clear that the ceramic ball material 5 according to Examples has good polishing efficiency.

As described above, the ceramic ball material 5 helps suppress damage to the ceramic material during machining using surface plate.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A ceramic ball material, comprising:
a spherical portion; and
a band-shaped portion formed over a circumference of a surface of the spherical portion,
wherein the band-shaped portion has a width in a range of 0.5 mm or more and 4.0 mm or less, both shoulders of which are provided with an R section having a radius of curvature of 0.02 mm or more, and
wherein an outer periphery of the band-shaped portion is concave with respect to both shoulders, the concave outer periphery having a radius of curvature of 5 mm or more.

2. The ceramic ball material according to claim 1, wherein the spherical portion has an arbitrary diameter of 0.5 mm or more.

3. The ceramic ball material according to claim 1, wherein the spherical portion has an arbitrary diameter in a range of 8 mm or more and 70 mm or less, and a height of the band-shaped portion is 1% or less of the diameter of the spherical portion.

4. The ceramic ball material according to claim 1, wherein a diametral ratio between an outer periphery of the band-shaped portion and the spherical portion is 0.9 or more and 1.1 or less.

5. The ceramic ball material according to claim 1, wherein the ceramic ball material comprises any one of aluminum oxide, silicon nitride, boron nitride, and zirconium oxide in an amount of 85% by mass or more.

6. The ceramic ball material according to claim 1, wherein the ceramic ball material is a ceramic sintered compact comprising 85% by mass or more of silicon nitride.

7. The ceramic ball material according to claim 1, wherein the concave of the outer periphery of the band-shaped portion has a ratio of "a radius of curvature/a width of the band-shaped portion" of 10 or less.

8. The ceramic ball material according to claim 1, wherein the radius of curvature is 30 mm or less.

9. The ceramic ball material according to claim 1, wherein a height of the band-shaped portion is 2.5% or less of an arbitrary diameter of the band-shaped portion.

10. The ceramic ball material according to claim 9, wherein the ceramic ball material is a ceramic sintered compact comprising 85% by mass or more of silicon nitride.

11. The ceramic ball material according to claim 10, wherein the spherical portion has an arbitrary diameter of 0.5 mm or more.

12. The ceramic ball material according to claim 11, wherein the spherical portion has an arbitrary diameter in a range of 8 mm or more and 70 mm or less, and a height of the band-shaped portion is 1% or less of the diameter of the spherical portion.

13. The ceramic ball material according to claim 12, wherein the concave of the outer periphery of the band-shaped portion has a ratio of "a radius of curvature/a width of the band-shaped portion" of 10 or less.

14. The ceramic ball material according to claim 13, wherein the radius of curvature is 30 mm or less.

15. A method for manufacturing a ceramic ball, comprising polishing the ceramic ball material according to claim 14.

16. The method for manufacturing a ceramic ball according to claim 15, wherein The polishing is performed so that the ceramic ball has a surface roughness Ra of 0.01 μm.

17. A method for manufacturing a ceramic ball, comprising polishing the ceramic ball material according to claim 1.

18. A ceramic ball obtained by polishing the ceramic ball material according to claim 1.

* * * * *